United States Patent [19]
Dartois

[11] 3,710,030

[45] Jan. 9, 1973

[54] NETWORK INTERSTAGE GRADING ARRANGEMENT

[75] Inventor: Jean-Pierre Andre Dartois, Paris, France

[73] Assignee: International Standard Electric Corporation, New York, N.Y.

[22] Filed: March 22, 1971

[21] Appl. No.: 126,404

[30] Foreign Application Priority Data

April 1, 1970 France ................................7011616

[52] U.S. Cl. ..............179/18 AG, 179/18 GE, 179/98

[51] Int. Cl. ..............................................H04q 1/16

[58] Field of Search...179/18 AG, 18 GE, 18 GF, 22, 179/98

[56] References Cited

UNITED STATES PATENTS

| | | | |
|---|---|---|---|
| 3,106,615 | 10/1963 | Spjednes | 179/18 GF |
| 2,970,190 | 1/1961 | Zahlhaas et al. | 179/22 |

FOREIGN PATENTS OR APPLICATIONS

| | | | |
|---|---|---|---|
| 1,512,933 | 10/1969 | Germany | 179/18 AG |
| 1,248,115 | 8/1967 | Germany | 179/98 |
| 950,579 | 2/1964 | Great Britain | 179/18 AG |

*Primary Examiner*—Thomas W. Brown
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A switching network is provided by which the outputs of a stage and the inputs of the next stage each bear a number, the numbers of an output and of an input interconnected by a link are related by relations so that, whatever the application is, certain digit-to-digit correspondences ($b_1=c_1$, for example) are always maintained. This makes it possible to define output groups and input groups to be connected via link groups, the arrangement of the link groups being the only one which varies with the application. The invention allows grading between selection stages in a telephone or telegraph exchange, without using a distribution frame.

4 Claims, 8 Drawing Figures

Inventor

J.P.A. DARTOIS

By O.P. Warner

Attorney

Figure 1:
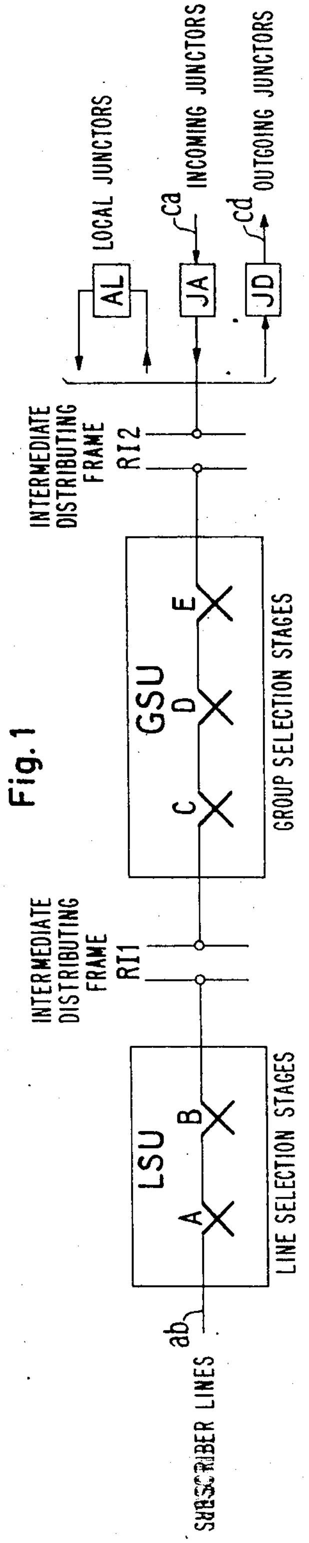

| 0 | | $l_5$ | $l_4$ | $l_3$ | $l_2$ | $l_1$ | $l_0$ | $b_2$ | $b_1$ | $b_0$ | $nb_3$ | $nb_2$ | $nb_1$ | $nb_0$ |
|---|---|---|---|---|---|---|---|---|---|---|---|---|---|---|
| 1 | 8 LSU | | | | $sc_2$ | $sc_1$ | $sc_0$ | $sc_3$ | $c_1$ | $c_0$ | $c_2$ | $bg_1$ | $bg_0$ | $c_3$ |
| 2 | 16 LSU | | | $sc_3$ | $sc_2$ | $sc_1$ | $sc_0$ | $c_2$ | $c_1$ | $c_0$ | $bg_2$ | $bg_1$ | $bg_0$ | $c_3$ |
| 3 | 32 LSU | | $c_3$ | $sc_3$ | $sc_2$ | $sc_1$ | $sc_0$ | $c_2$ | $c_1$ | $c_0$ | $bg_2$ | $g_0$ | $bg_0$ | $bg_1$ |
| 4 | 64 LSU | $c_2$ | $c_3$ | $sc_3$ | $sc_2$ | $sc_1$ | $sc_0$ | $bg_2$ | $c_1$ | $c_0$ | $g_1$ | $g_0$ | $bg_0$ | $bg_1$ |

| 0 | | $l_5$ | $l_4$ | $l_3$ | $l_2$ | $l_1$ | $l_0$ | $b_2$ | $b_1$ | $b_0$ | $nb_3$ | $nb_2$ | $nb_1$ | $nb_0$ |
|---|---|---|---|---|---|---|---|---|---|---|---|---|---|---|
| 1 | 4 LSU | | | | | $sc_1$ | $sc_0$ | $sc_3$ | $c_1$ | $c_0$ | $sc_2$ | $bg_0$ | $c_3$ | $c_2$ |
| 2 | 8 LSU | | | | $sc_2$ | $sc_1$ | $sc_0$ | $sc_3$ | $c_1$ | $c_0$ | $bg_1$ | $bg_0$ | $c_3$ | $c_2$ |
| 3 | 16 LSU | | | $sc_3$ | $sc_2$ | $sc_1$ | $sc_0$ | $bg_2$ | $c_1$ | $c_0$ | $bg_1$ | $bg_0$ | $c_3$ | $c_2$ |
| 4 | 32 LSU | | $c_3$ | $sc_3$ | $sc_2$ | $sc_1$ | $sc_0$ | $bg_2$ | $c_1$ | $c_0$ | $bg_1$ | $bg_0$ | $g_0$ | $c_2$ |
| 5 | 64 LSU | $bg_0$ | $c_3$ | $sc_3$ | $sc_2$ | $sc_1$ | $sc_0$ | $bg_2$ | $c_1$ | $c_0$ | $bg_1$ | $g_1$ | $g_0$ | $c_2$ |

NETWORK INTERSTAGE GRADING ARRANGEMENT

The present invention concerns improvements to switching networks and, more particularly, to switching networks with several stages of switching matrices such as those used in space switching telephone or telegraph exchanges.

A switching matrix possesses a first group of accesses which will be arbitrarily called inputs, a second group of accesses which will be called outputs and crosspoint contacts enabling the connection of each input to all or some outputs and of each output to all or same inputs.

A switching network comprising several selection stages possesses also inputs and outputs and it is constituted by an arrangement of interconnected matrices. In a general way, the network inputs are connected to the inputs of a certain number of matrices constituting a first selection stage. The outputs of the first stage matrices are connected, each by one "link," to the inputs of a certain number of matrices constituting a second selection stage. Similarly, the outputs of the second stage matrices are connected to the inputs of the third stage matrices, and so on. The network outputs are connected to the outputs of the last stage matrices.

Such an arrangement not only enables the connection from a network input to any network output, by a connection path including a matrix of each stage and the corresponding links between stages but also offers between the considered input and output, the greatest possible number of separate connection paths, in order to have the greatest possibility of satisfying any connection request, and finally, in order that the network handles the traffic in the best conditions.

Such traffic considerations would tend to distribute outputs of each matrix of any stage on all the inputs of the next stage and, reciprocally, to distribute the inputs of each matrix of the next stage on all the outputs of the first considered stage, performing what will be called a general grading. However experience and calculation have shown that such a general grading was not necessary for all the network stages. The switching networks are thus generally constituted from selection units.

A selection unit includes a defined number of a first stage matrices, a defined number of a second stage matrices and links, interconnecting, inside the selection unit, the outputs of the first stage matrices to the inputs of the second stage matrices. In this case, a two-stage selection unit is concerned. In the same way a selection unit with three stages or more may be designed.

A four-stage switching network may thus be composed of two-stage line selection units constituting the first two stages of the network, then of two-stage group selection units constituting the last two stages of the network. Such an example of switching network is described in the paper by Ferdinand Gohorel entitled "Pentaconta Dial Telephone Switching System" in the publication "Electrical Communication" of June 1954.

An advantage of such a design is that switching networks of increasing dimensions can be built by merely adding standard selection units and that, particularly, it avoids any modification of the existing selection units when extending the network. However, there subsists a general grading between the outputs of the line selection units and the inputs of the group selection units. Indeed, it is preferable that the outputs of a line selection unit matrix be connected to the different group selection units and that the inputs of a group selection unit matrix be connected to the different line selection units. This general grading is defined for each network and must be modified when an extension is made.

A general grading such as that above-described is usually done by means of an intermediate distributing frame. The outputs of the previous stage are connected to tags "outputs" of the intermediate distributing frame. The inputs of the next stage are connected to tags "inputs." A removable wiring connects each "output" to each "input," in order to carry out the grading provided in each application. This wiring is modified and completed when an extension is made.

The object of the present invention concerns improvements to switching networks facilitating the achievement of a general grading and making it possible to avoid any intermediate distributing frame. It is applicable to any case of general grading although it has been more specially studied for a general grading between selection units.

In a general way, the invention is applicable to a grading between accesses (outputs) of a first stage and accesses (inputs) of a second stage. Each output may be designated by a number of the type :

$$B_j \ldots B_{f+1} B_f \ldots B_o \qquad \text{(a)}$$

where $B_j \ldots B_{f+1}$ are the digits of a matrix number and $B_f \ldots B_o$ are the digits of the number of a matrix output. Similarly, each input may be designated by a number of the type :

$$C_n \ldots C_{g+1} C_g \ldots C_o \qquad \text{(b)}$$

where $C_n \ldots C_{g+1}$ are the digits of a matrix number and $C_g \ldots C_o$ the digits of the number of a matrix input.

According to the invention, a general grading is obtained by interconnecting an output and an input whose numbers are first related by a relation of the type :

$$(B_j, \ldots B_{f+1}, B_f, \ldots B_o) = (C_n, \ldots C_{g+1}, C_g, \ldots C_o) \qquad \text{(c)}$$

so that to each digit of the left part — that is of the output number — corresponds a digit of the right part — that is of the input number — the correspondence law varying according to the application and, in particular, according to the switching network dimensions, and are also related, by a limited relation of the type :

$$B_u B_v = C_x C_y \qquad \text{(d)}$$

so that to certain digits of the output number always correspond certain digits of the input number, whatever the grading is, which allows the constitution of output grading groups and of input grading groups and the connection of the outputs to the inputs by identical groups in all cases, the correspondence law between the grading groups only varying according to the application and being alone modified in the case of extension.

Moreover, it will be provided to build the switching network in equipment units (racks or sub-racks) so that an equipment unit of the first stage includes outputs whose numbers are differentiated only by the digits :

$$B_i \ldots B_{f+1} B_f \ldots B_o \qquad \text{(e)}$$

of the previous number (a) and so that an equipment unit of the second stage includes outputs whose numbers are differentiated only by the digits :

$$C_m \ldots C_{g+1} C_g \ldots C_o \quad (f)$$

of the previous number (b) and it will be provided that the digits concerned by the relation (d) defining the composition of the grading groups will be chosen among the digits of the expression (e) and (f) respectively, so that the constitution of the grading groups takes place inside each equipment unit, which will make it possible to design identical equipment units for each stage each having a wiring independent of the other units of the stage.

The invention then advantageously allows the realization of a general grading in a switching network, between output groups of a stage and input groups of the next stage, constituted within equipment units, by providing, in each unit, a connector for each grading group and by establishing the connections between the groups by means of plug-in removable cables, which while avoiding the installation of an intermediate distributing frame, facilitates as well the building and the mounting of the switching network as the extension work.

Moreover, in order to create output groups (inputs) belonging to different equipment units, the invention provides, as a variant, the creation of provisional output groups (inputs) in each equipment unit and the connection of these provisional groups to a simplified distributing frame through which the links of several provisional groups are redistributed in order to constitute grading groups satisfying the relation (d). In this case, the connection of the provisional groups of the output units (inputs) to the simplified distributing frame will be done by means of plug-in cables, as well as the connection of the grading groups of the simplified distributing frame to the input units (outputs) while the simplified distributing frame whose function is to redistribute provisional groups into grading groups, will have a regular structure and can be wired in the factory.

Figures 2, 3:
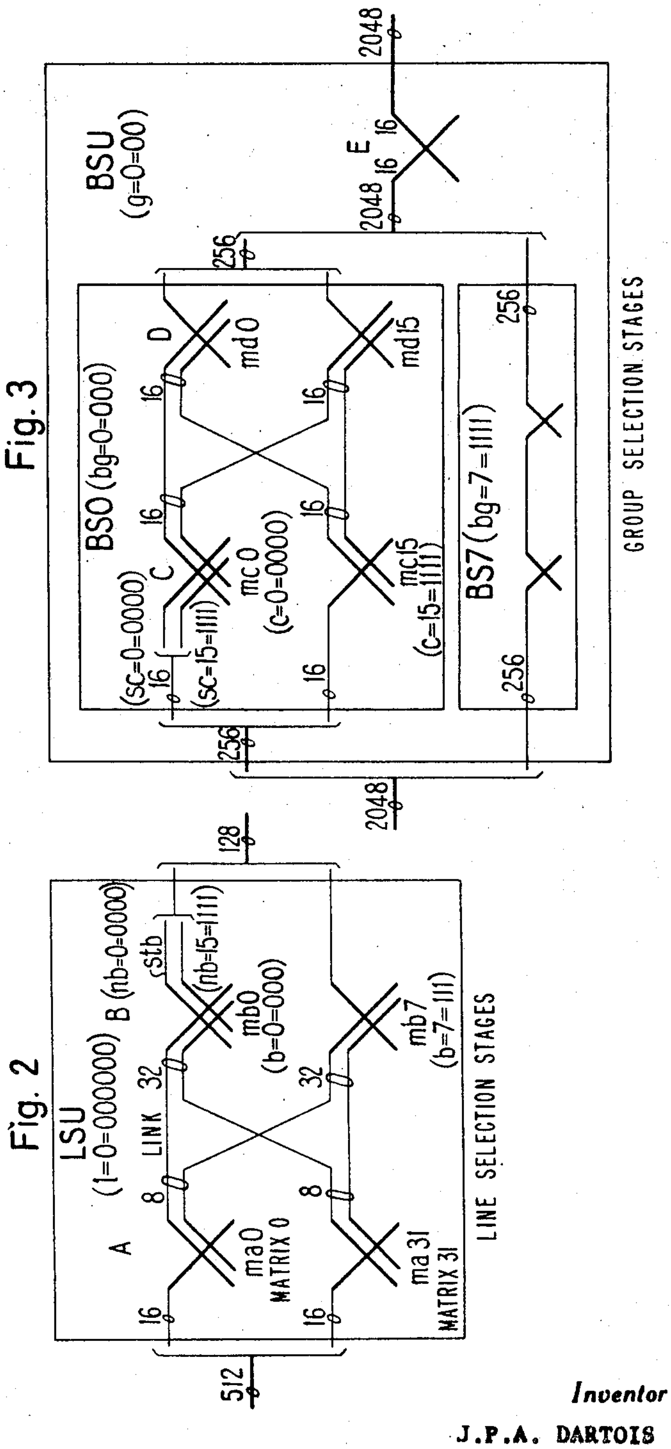
Figures 6, 7, 8:
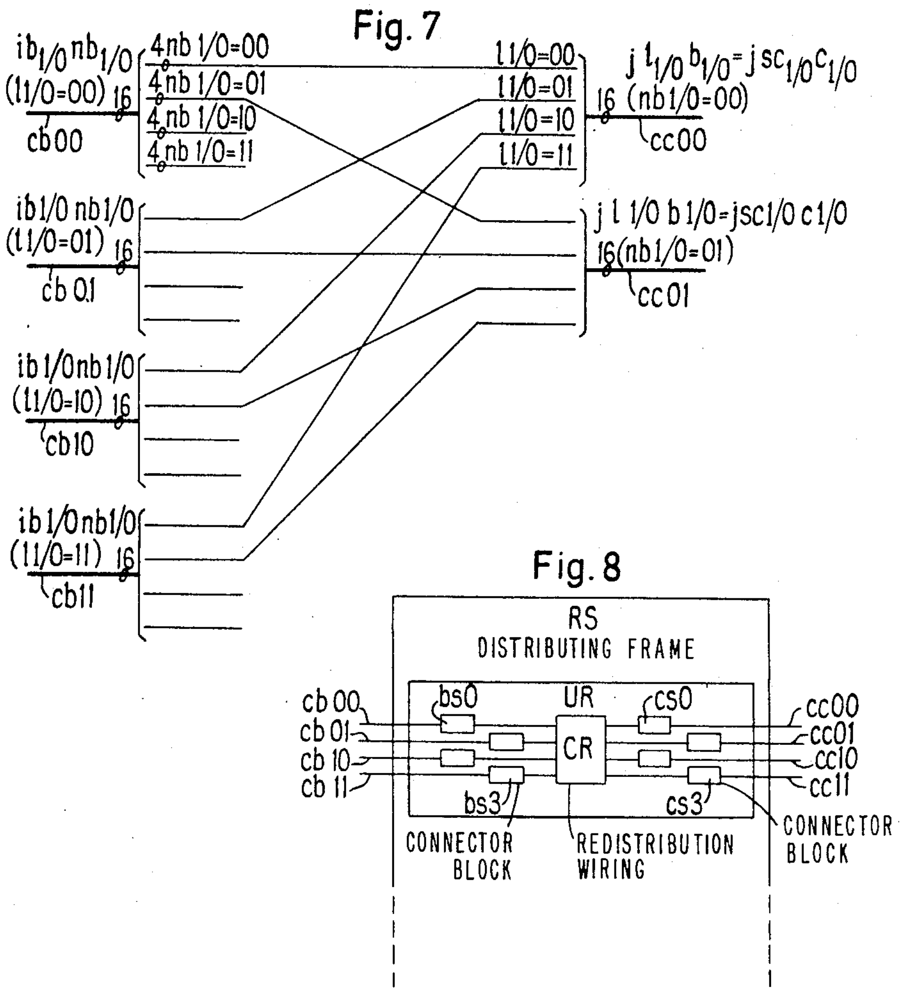
Figures 4, 5:
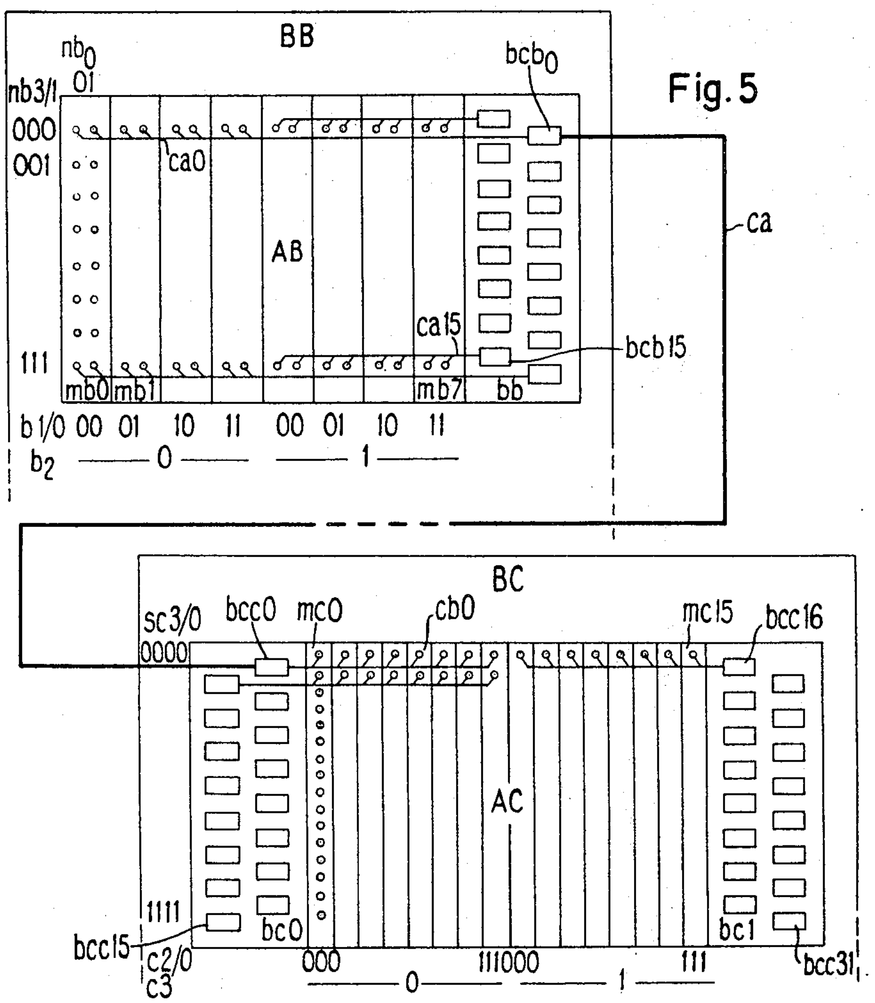

Various other features will be disclosed from the following description given by way of non-limited example, and with reference to the accompanying drawings which represent:

FIG. 1, a diagram showing the general organization of a telephone exchange to which the present invention may be applied;

FIG. 2, the diagram of an embodiment of a line selection unit (LSU) of the exchange in FIG. 1;

FIG. 3, the diagram of an embodiment of a group selection unit (GSU) of the exchange in FIG. 1;

FIG. 4, a table giving different equations defining, according to the invention, the wiring between the selection stages B and C of the exchange in FIG. 1;

FIG. 5, an embodiment of the wiring between stages B and C of the exchange in FIG. 1, according to the equations of FIG. 4;

FIG. 6, a table giving different equations defining, according to a variant of the invention, the wiring between selection stages B and C of the exchange in FIG. 1;

FIG. 7, a diagram illustrating the redistribution of provisional groups into grading groups, in the scope of the application corresponding to the equation of FIG. 6;

FIG. 8, an embodiment of a simplified distributing frame enabling the redistribution depicted in FIG. 7.

First will be described, referring to FIG. 1, the general organization of a telephone exchange to which may be applied the present invention.

This exchange includes:

- a switching network with five stages A, B, C, D, E, divided into line selection units LSU and group selection units GSU;
- subscribers' lines *ab* connected to the inputs of the line selection units LSU;
- an intermediate distributing frame RI 1 enabling the connection of the outputs of the line selection units LSU to the inputs of the group selection units GSU;
- local junctors AL having two accesses, one for the connection of a calling subscriber's line, the other for the connection of a called line, and serving to set up calls between the local subscribers;
- outgoing junctors JD having an access for the connection of a calling subscriber's line and equipping circuits *cd* leading to other exchanges, with the view to setting up outgoing calls.
- incoming junctors JA equipping circuits *ca* from other exchanges and having an access for the connection of a called subscriber's line, with the view to setting up incoming calls;
- an intermediate distributing frame RI 2 enabling the connection of the junctor accesses to the outputs of the group selection units.

The organization and the general operation of such an exchange are well known.

A calling subscriber's line, after having transmitted the called number to non-represented control apparatus, is connected, via a line selection unit LSU and a group selection unit GSU, either to an access of one of the local junctors AL, with the view to setting up a call with another local subscriber, or to the access of one of the outgoing junctors JD, with the view to setting up a call with a subscriber of another exchange.

A called subscriber's line is connected in the same way, either to an access of one of the local junctors AL, if the call is originated from another local subscriber, or to the access of one of the incoming junctors JA, if the call is originated from a subscriber of another exchange.

Now will be described, referring to FIG. 2, an embodiment of the line selection units LSU of FIG. 1.

The selection unit of FIG. 2 is constituted by 32 matrices *ma* 0 to *ma* 31, belonging to the selection stage A (matrices A), and by eight matrices *mb* 0 to *mb* 7 belonging to the selection stage B (matrices B).

To the inputs of each matrix A are connected 16 subscriber's lines, that is a total of 512 lines for the selection unit.

Each matrix A has eight outputs each connected by a link to one input of one of the matrices B.

To each matrix B are connected 32 links each coming from one of the matrices A.

Each matrix B has 16 outputs, such as stb, that is, a total of 128 outputs for each line selection unit.

Each input of the line selection unit can be connected to each output by one single connection path using the link connecting the matrix A to which the input belongs to the matrix B to which the output belongs.

In FIG. 2, the number $b$ of each matrix B has been indicated in decimal form and then in binary form. The matrices B bear binary numbers from 000 to 111. Similarly, the numbers $nb$ of the outputs of a matrix B ($mb$ 0) are indicated, in decimal and binary form. It can be seen that the outputs of the matrices B bear numbers from 0000 to 1111.

Finally, the exchange of FIG. 1 includes a certain number of line selection units such as those of FIG. 2. Each of them will bear a number 1 and FIG. 2 represents the unit bearing the number 0, that is 000000 in binary notation, in a system which may have up to 64 line selection units.

An output of stage B (FIG. 1) is thus finally identified by:

- its rank in a matrix, defined by the number $nb$ including, in binary notation, four digits which will be referenced $nb$ 3, $nb$ 2, $nb$ 1, $nb$ 0 — or $nb$ 310 — in decreasing order;
- the rank of the matrix in a line selection unit, defined by the number $b$ including three binary digits which will be called $b_{2/0}$;
- the rank of the line selection unit, defined by the number 1 including, for example six binary digits which will be called $1_{5/0}$.

By juxtaposing these numbers, the number of an output of stage B (output B) is obtained:

$$1_5 1_4 1_3 1_2 1_1 1_0 b_2 b_1 b_0 nb_3 nb_2 nb_1 nb_0 \quad (1)$$

An embodiment of the group selection units GSU of FIG. 1 is represented in FIG. 3. The group selection unit is constituted by selection blocks such as BS 0 and BS 7, associated by matrices of the selection stage E.

A selection block includes 16 matrices, $mc$ 0 to $mc$ 15, belonging to stage C (matrices C) each having 16 inputs and 16 outputs, and 16 matrices, $md$ 0 to $md$ 15, belonging to stage D (matrices D), each also having 16 inputs and 16 outputs. A link connects an output of each matrix C to an input of each matrix D, in the same way as in a line selection unit. Thus a selection block has a total of 256 inputs and 256 outputs. Each input of the block can be connected to each output by one single connection path using a link connecting the matrix C to which belongs the input, to the matrix D to which belongs the output.

The stage E is constituted by matrices with 16 inputs and 16 outputs (matrices E). The number of matrices E is the same as the total number of matrices D in the different selection blocks.

To the outputs of the matrices E are connected as indicated by FIG. 1, the accesses of the different junctors via the intermediate distributing frame RI2.

A complete group selection unit includes eight selection blocks and 8 × 16 matrices E. The network may include one, two or four selection units. In smaller exchanges, there will be only a partial group selection unit constituted by two, four or eight selection blocks and an appropriate number of matrices E.

As for the outputs of the line selection with of FIG. 2, there has been indicated in FIG. 3 the numbers $sc$ of the inputs of a matrix C ($mc$ 0), with their value in decimal and binary notation, as well as the numbers $c$ of the matrices C in one block, the numbers $bg$ of the blocks and the number $g$ of the group selection unit. To these numbers correspond binary digits to which will be respectively given the references: $sc_{3/0}$, $c_{3/0}$, $bg_{2/0}$, $g_{1/0}$. Finally the number of an input of stage C (input C) is:

$$g_1 g_0 bg_2 bg_1 bg_0 c_3 c_2 c_1 c_0 sc_3 sc_2 sc_1 sc_0 \quad (2)$$

The present invention concerns in a general way the stage interconnections in a connection network and, more particularly, in the described application by referring to FIGS. 1, 2 and 3, the interconnections between stages B and C, that is between, on the one hand, the line selection units and, on the other hand the group selection unit (s).

As far as possible, the outputs of a matrix of stage B must be distributed on:

- the different group selection units;
- the different selection blocks of the group selection units;
- the different matrices of the selection blocks.

Reciprocally, the inputs of each matrix of stage C must be distributed on:

- the different line selection units,
- the different matrices of the line selection units.

In other terms, a grading as general as possible must be carried out between the outputs of stage B and the inputs of stage C.

According to the invention, for a given capacity of the switching network, the connections between stages B and C are defined by a grading equation characterizing an equality between each digit of the number of an output B and one of the digits of the number of an input C. This equation thus defines the number of the input C to which must be connected each output B.

For example, in a switching network constituted by four line selection units and one group selection unit with only two selection blocks, an equation of this type will be:

$$1_1 1_0 b_2 b_1 b_0 nb_3 nb_2 nb_1 nb_0 = sc_1 sc_0 sc_3 c_1 c_0 sc_2 bg_0 c_3 c_2 \quad (3)$$

This equation means that, in the numbers of an output B and of an input C to be interconnected, the digits $1_1$ and $sc_1$ are equal, as $1_0$ and $sc_0$, etc . . . up to $nb_0 = c_2$. It may be applied to any link but is only valid for a four-line selection unit exchange.

As it can be seen by examining the equation (3), the 16 outputs of a matrix of stage B, differentiated by the value of the digits $nb_{3/0}$, are equally distributed on both selection blocks ($bg_0 = 0$ or 1, according to $nb_2$); the eight outputs B going to one block are connected to four different matrices C ($c_3 c_2 = nb_1 nb_0$), at the rate of two outputs B per matrix C ($sc_2 = 1$ or 0, according to $nb_3$).

Similarly, the 16 inputs of a matrix C, differentiated by the value of digits $sc_{3/0}$, are distributed on the four line selection units ($1_1 1_0 = sc_1 sc_0$); the four inputs C associated with a line selection unit are connected to matrices B ($b_2 = sc_3$), at the rate of two inputs C per matrix B ($sc_2 = nb_3$).

This distribution is not perfect, since the 16 outputs of a matrix B could have been connected to 8 matrices, in each selection block, but it has been chosen for reasons which will subsequently appear. Such a distribution brings no sensible restriction to a correct traffic handling.

FIG. 4 represents in the form of a table, five equations corresponding to five different capacities of the switching network, the line 0 representing the digits of the number of the outputs B, whereas each of the lines 1 to 5 represents the digits of the number of an input C, in the five network capacities, the digits placed on a same vertical line being equal.

The lines 0 and 1 of the table of FIG. 4 correspond to the case of a four-line selection unit exchange (4 LSU) ; the lines 0 and 2 to 5 respectively correspond to networks with 8, 16, 32 and 64 line selection units (8 to 64 LSU).

In fact, it is only an example of application of the invention and the indicated capacities (4 to 64 LSU) are maximum capacities in each case ; intermediate capacities may be provided without going beyond the scope of the invention.

In the first two lines, is found the above-described equation (3). The lines 2 to 5 give similar equations, with one more digit at each line, in order to take into account the capacity doubling.

According to the equation given by the lines 0 and 2, the outputs ($nb_{3/0}$) of a matrix B are distributed on the four selection blocks ($bg_1$ $bg_0$) and on four matrices C in each of them ($c_3$ $c_2$). The inputs of a matrix C ($sc_{3/0}$) are distributed on eight line selection units ($l_{2/0}$) and on two matrices B ($b_2$) in each of them.

According to the equation of line 3, the outputs of a matrix B are distributed on four among the eight selection blocks. And a form matrices C in each of them as previously. However, the outputs of a line selection unit ($b_{2/0}$, $nb_{3/0}$) are distributed on all the matrices C ($bg_{2/0}$ $c_{3/0}$) at the rate of one output per matrix C. The inputs of a matrix C are evenly distributed on the 16 line selection units.

According to the equations of the line 4 and of the following line, the outputs of a matrix B remain distributed on eight group selection blocks and the outputs of a line selection unit go each to a different matrix C, whereas the inputs of a matrix C are distributed on 16 line selection units.

In the various cases, it will be noted in particular that the outputs of a line selection unit ($b_{2/0}$ $nb_{3/0}$) are distributed on the greatest possible number of matrices C and that the inputs of a matrix C ($sc_{3/0}$) are distributed on the greatest possible line selection units. The grading remains satisfactory and enables a smooth traffic handling.

Moreover, and always according to the invention, the different equations represented by FIG. 4 and corresponding to the different capacities of a switching network of the type depicted in FIGS. 1 to 3 have all the characteristic of including the equality $b_1\, b_0\, nb_0 = c_1\, c_0\, c_2$. This means that to each eight output group of a line selection units, only differentiated by the different values of digits $b_1$, $b_0$, $nb_0$, corresponds a determined group of eight inputs of a group selection block only different by the corresponding values of digits $c_1\, c_0\, c_2$.

In other terms, according to the invention, on the one hand, the outputs of a selection stage one grouped by $n$ and, on the other hand, the inputs of the next stage are also grouped by $n$, $n = 8$ in the present case, and this whatever the exchange capacity is. The connections between stages can thus be established via link groups each going from one group of outputs B to one group of inputs C.

Moreover, as digits $b_1$, $b_0$, $nb_0$ differentiate matrices and outputs of stage B belonging to a same line selection unit, the constitution of output groups can be done within line selection units. Thus, by providing the mounting of matrices B of a same line selection unit inside a same equipment unit (rack or sub-rack, for example), the output groups will be constituted within this equipment unit, which limits wiring.

Similarly, the digits $c_1$, $c_0$, $c_2$ differentiate matrices belonging to the same selection block. It will be provided to mount the matrices C of a selection block in a same equipment unit, which will enable the constitution of the input groups within this equipment unit.

As the access groups to be connected are constituted in the equipment units, the invention thus provides to place a connector for each group, in these equipment units, and to set up the connections by means of removable plug-in cables, in a way which is illustrated by FIG. 5.

FIG. 5 represents a rack BB provided for receiving line selection unit matrices. This rack includes sub-racks, such as AB, receiving all the matrices B of a line selection unit. This sub-rack includes eight compartments each receiving one of the matrices *mb* 0 to *mb* 7 (FIG. 2) of a line selection unit, as indicated in the Figure and one compartment *bb* including 16 connector blocks *bcb*0 to *bcb*15 each having eight outputs.

In each matrix compartment, small circles have been (partially) drawn which represent the corresponding 16 outputs B, on two columns, according to the value of digit $nb_0$ and in the order defined by the values of $nb_{3/1}$. Also, underneath each compartment, the value of digits $b_{1/0}$ and $b_2$ constituting the number of each matrix B has been indicated.

As it can be seen, the eight outputs B for which $nb_{3/1} = 0$ and $b_2 = 0$ are connected by a cable form strand *ca* 0 to the connector block *bcb*0. The other output groups are connected to the other connector blocks in the same way, up to the last group ($nb_{3/1} = 111$, $b_2 = 1$) connected by *ca* 15. A regular wiring thus enables the constitution of output groups B in the equipment sub-racks and the connection of each group to a connector block according to a constant order. All the matrix sub-racks of stage B of the switching network are identical.

FIG. 5 also represents a rack BC provided for receiving particular matrices of stage C, in sub-racks such as AC. The sub-rack AC includes 16 compartments each housing one of the matrices *mc* 0 to *mc* 15 (FIG. 3) of a group selection block, as indicated in the Figure, as well as two compartments *bc* 0 and *bc* 1, each housing 16 connector blocks, *bcc* 0 to *bcc* 15 and *bcc* 16 to *bcc* 31, with eight inputs each.

In each matrix compartment, the 16 corresponding inputs C have been partially drawn, in one single column, in the order defined by the values of $sc_{3/0}$. Underneath each matrix compartment, the value of $c_{2/0}$ and $c_3$ has been indicated.

As it can be seen, the eight inputs C for which $sc_{3/0} = 0$ are connected by a cable form strand *cb* 0 to the connector block *bcc* 0. The other input groups 0 are connected to the other connector blocks in the same way. Like the sub-racks of matrices B, the sub-racks of matrices C are all identical and provided with a regular wiring.

Finally, FIG. 5 also represents a grading cable *ca* connecting an output group of the sub-rack AB to an input group of the sub-rack AC. This cable will be advantageously provided, at its two ends, with connectors which may be plugged in the sub-rack connector blocks. In this way, according to the invention, all the wiring between stages B and C of the switching network will be made by means of plug-in removable cables, per group of eight links, which facilitates the installation work.

Upon extending the switching network, it only becomes necessary to complete and modify the arrangement of these plug-in cables, which can be achieved in a simple and quick way by low-qualification people.

Besides, it will be seen, referring anew to FIG. 4, that the invention allows easy extensions without having to immobilize totally the exchange as half of the links remains unchanged at each extension.

Indeed, by comparing both equations given by the lines 0, 1 and 2 of the table of FIG. 4, it can be seen that, from a capacity to another, all the correspondences between the digits of the grading equations have been maintained, except that concerning the digits $nb_3$ and $sc_2$. The digit $nb_3$ becomes equal to $bg_1$, whereas the digit $sc_2$ becomes equal to $1_2$. Now, it may be considered that in the equation defined by the lines 0 and 1 of FIG. 4, the digits $1_2$ and $bg_1$ which are absent have a zero value, this value designating the line selection units and the group selection blocks already existing, whereas to designate the accesses of the line selection units and of the group selection blocks added for the extension, the digits $l_2$ and $bg_1$ will have the value 1. Thus, the equation applicable in the capacity defined by lines 0 and 1 is identical to the equation defined by lines 0 and 2, for all the links connecting outputs B whose number includes $nb_3 = 0$ to inputs C whose number includes $sc_2 = 0$. The inequality only appears when $nb_3 = sc_2 = 1$, that is for only half the links initially existing. Therefore, during this extension, half the plug-in cables will remain unchanged. The others, however remaining plugged-in, for example on the side of the sub-racks of the matrices of stage B, will have to be displaced in order to be plugged-in in the sub-racks of the added group selection blocks. For this purpose, from the outset, grading cables of sufficient length will be provided.

It is easy to check on the table of FIG. 4 that which is valid for the first extension step is also valid for all other steps. The invention thus finally enables, not only the wiring between stages B and C of the switching network with a general grading, by means of removable plug-in cables, while maintaining a simple wiring within the equipment units (sub-racks), but also easy extensions, each extension step only necessitating the displacement of half the removable cables.

Now will be described, referring to FIGS. 6, 7 and 8, an alternative of the invention according to which, by means of complementary means, it is possible to constitute output groups (inputs) in the equipment units for a first selection stage and to connect each of these groups to the inputs (outputs) of a second stage belonging to several different equipment units. The chosen application is that of the connection between the stages B and C of the switching network of FIGS. 1, 2 and 3.

FIG. 6 represents a table of equations similar to that of FIG. 4. The line 0, in particular, is the same as previously. The lines 1, 2, 3 and 4 enable the definition of four grading equations corresponding to four switching network capacities, from 8 to 64 line selection units (8 to 64 LSU). It is redundant to detail these equations ; their examination may be done as for the equations of FIG. 4. Only the aspects of these equations concerning the wiring between stages will be dealt with.

By examining FIG. 6, it will be seen immediately that a limited equality relation is maintained in all cases. This limited relation is :

$$1_1\, 1_0\, b_1\, b_0 = sc_1\, sc_0\, c_1\, c_0 \quad (4)$$

As previously, such a relation has been maintained in all the equations in order to enable the constitution of output and input groups and the connection between these groups by plug-in cables. As the relation (4) concerns four binary digits, it will be possible to constitute 16-access groups connected by 16-link cables.

However, in this case, it is to be noted that, if the digits $sc_1$, $sc_0$, $c_1$, $c_0$ differentiate inputs belonging to the same selection block (see description concerning FIG. 3), the outputs differentiated by digits $1_1$, $1_0$, $b_1$, $b_0$ belong to four consecutive line selection units (see description relating to FIG. 2). The above wiring arrangements thus cannot be used.

FIG. 7 shows now it is possible to constitute 16-output groups differentiated by the digits $1_1$, $1_0$, $b_1$, $b_0$ from 16-output provisional groups each originated from a line selection unit, the 16 outputs of a provisional group being differentiated by the digits $b_1$, $b_0$, $nb_1$, $nb_0$.

In FIG. 7, the cable *cb* 00 includes 16 links associated to 16 outputs of a same line selection unit whose number $1_{1/0}$ has the value 00. These outputs whose numbers' include a common part *i* are differentiated by the digits $b_1$, $b_0$ and $nb_1$, $nb_0$. The cables *cb*01, *cb*10 and *cb* 11 include each 16 links associated with 16 outputs of the same rank as those of cable *cb* 00, but are respectively originated from the three next line selection units whose digits $1_{1/0}$ have respectively the value 01, 10, 11.

As indicated by FIG. 7, the 16 links of cable *cb*00 are distributed into 4 groups of 4 links, according to the value of digits $nb_{1/0}$. It is the same for the links of the other cables.

Moreover, the cable *cc*00 gathers the four groups of four links from the cables *cb*00 to *cb*11 characterized in that $nb_{1/0} = 00$.

As indicated by FIG. 7, the links of cable *cc*00 consequently are originated from four different line selection units ; their numbers include a common part *j* and are differentiated by the value of digits $b_{1/0}$ and $1_{1/0}$, which duly corresponds to the 16-link grading groups that the equations of FIG. 6 table provide.

The cable *cc*01 is also constituted by the gathering of the links from outputs differentiated only by the digits $1_{1/0}$ and $b_{1/0}$ ; cables *cc*10 and *cc*11 not represented are constituted in the same way and finally the group of cables *cb*00 to *cb*11 is extended by the group of cables *cc*00 to *cc*11.

The equations of FIG. 6 table are thus satisfied by constituting provisional output groups ($i\, b_{1/0}\, nb_{1/0}$) belonging to consecutive line selection units ($l_{1/0} = 00$ to 11) and by redistributing these outputs in order to make the required grading groups ($j\, l_{1/0}\, b_{1/0}$) appear.

FIG. 8 illustrates means enabling the redistribution of line selection unit outputs achieved according to FIG. 7. A simplified distributing frame RS includes redistribution units such as UR. The latter includes four connector blocks *bs*0 to *bs*3, four connector blocks *cs*0 to *cs*3, as well as a redistribution wiring CR. The cables *cb*00 to *cb*11 are plugged into the connector blocks *bs*0 to *bs*3, while cables cc00 to *cc*11 are plugged into the connector blocks *cs*0 to *cs*3. The redistribution wiring CR establishes exactly the connections between the cables as illustrated by FIG. 7.

The simplified distributing frame RS will have as many redistribution units such as UR as there are sets of four provisional groups of outputs, that is, according to the described example, a unit per 64 links. All these units will be identical. Consequently, the simplified distributing frame RS can be entirely manufactured at the factory in an economical way and the installation of the wiring between stages B and C of the switching network will be limited to the placing of the plug-in removable cables.

The above described arrangements relating to FIGS 6 to 8 are applicable, in a general way, each time the grading groups cannot be each constituted from accesses belonging to a same equipment unit or in other similar cases.

It will be noted that in the described applications of the invention, all the equipments have a binary configuration, the matrices having $16 = 2^4$ outputs or inputs, the numbers of matrices, the selection units and blocks being also powers of 2. Such a configuration is justified by the fact that the control functions of most of the latest exchanges depend upon a central unit assimilated to a digital computer processing binary data.

However, the invention would remain applicable whatever the equipment configuration is ; as far as relations of the type of those of FIGS 4 and 6 may be established.

It is obvious that the preceding descriptions have only been given by way of non-restricted example and that numerous alternatives may be considered without departing from the scope of the invention. All the numerical precisions have only been given in order to facilitate the descriptions and may vary with each application.

I claim:

1. A grading arrangement for switching system comprising a first and for second switching network, each network having a plurality of groups with a plurality of switching matrices in each group and a plurality of inputs and outputs from each matrix, the outputs of a matrix group in said first network forming the output of a first of said networks and the inputs to a group of matrices of said second network forming the input to said second network, means for addressing each output of said first network with a multiple number binary address comprised of a multiple-bit group portion, a multiple-bit matrix portion and a multiple-bit matrix output portion, means for addressing each input of said second network with a multiple number binary address comprising a multiple-bit group portion, a multiple-bit matrix portion and a multiple-bit matrix input portion, means for interconnecting each output of said one network with a certain input of said second network, the address of each input for connection being determined by an equality between the address of the output to which said input is to be connected and the address of said input, with predetermined ones of said binary bits of certain portions of the address of said output being equal to directly corresponding predetermined bits in the address of the input and other bits in said output address being equal to bits juxtaposed in a predetermined pattern relative to the corresponding bits in the input address.

2. A system as claimed in claim 1, wherein each of said groups includes a plurality of cascaded stages, each stage comprising a plurality of matrices, and in which there are individual links interconnecting the outputs of one matrix with the inputs of the matrix in the adjacent stage.

3. A system as claimed in claim 1, in which the interconnection of outputs of said one network and the inputs of the other network are effected by plug-in cables, each cable comprising a plurality of individual conductors.

4. A system as claimed in claim 1, wherein the number of groups in said networks comprise a plurality of groups greater than said first plurality and requiring more binary bits for the group portion of the address of an output in said networks, and said equality requires only the change of position of two binary bits in said second network juxtaposition as compared with the address of said first plurality plus the addition of at least one binary bit representing the added excess of groups.

* * * * *